United States Patent [19]

Indebetouw

[11] 4,272,196

[45] Jun. 9, 1981

[54] OPTICAL SIZING MASK AND PROCESS

[75] Inventor: Guy Indebetouw, Blacksburg, Va.

[73] Assignee: Lasag S.A., Thun, Switzerland

[21] Appl. No.: 3,027

[22] Filed: Jan. 12, 1979

[51] Int. Cl.³ .......................................... G01B 11/30
[52] U.S. Cl. .................................. 356/371; 356/395
[58] Field of Search ................. 356/359, 371, 395; 250/237 G

[56] References Cited

U.S. PATENT DOCUMENTS

| 3,614,237 | 10/1971 | Kyle ....................................... 356/395 |
| 3,663,107 | 5/1972 | Denis ................................. 250/237 G |
| 3,858,981 | 1/1975 | Jaerisch .............................. 356/359 |
| 4,030,830 | 6/1977 | Holly .................................. 356/359 |

Primary Examiner—Craig E. Church

Attorney, Agent, or Firm—Sherman & Shalloway

[57] ABSTRACT

A process and mask for use in the process making it possible optically to measure precisely and rapidly sizes in elevation. A group of fringes of regular light, in uniform translation at constant velocity, is projected on the object to be measured and the image of the projected fringes is observed. The measurement of the phase difference of the reflected or diffused light signal at two points of the masked image plane is proportional to a variation in the relative height of the two corresponding object points, thereby allowing comparison to a control piece. The process makes it possible to measure absolute or relative sizes in elevation at two critical points of pieces in a production line. It also makes it possible to determine the profile of any piece.

12 Claims, 2 Drawing Figures

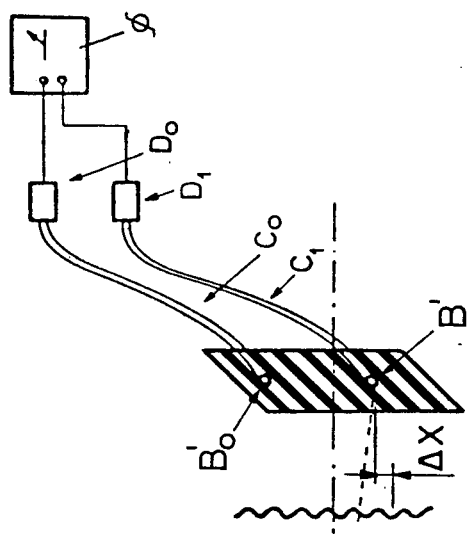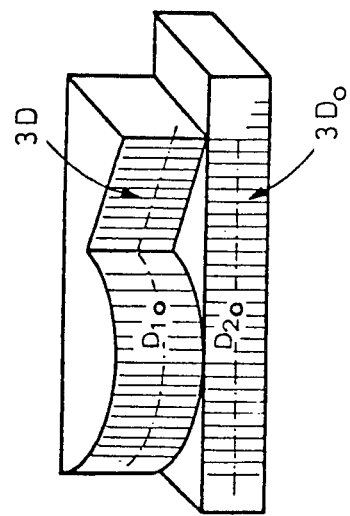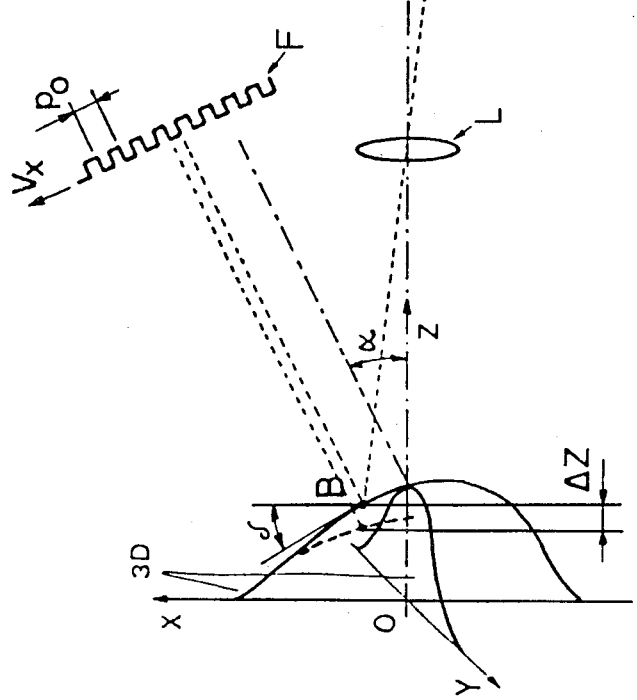

OPTICAL SIZING MASK AND PROCESS

BACKGROUND OF THE INVENTION

1. Field of the Invention

This invention relates to a process of optical sizing and to the means for using the process. This invention particularly relates to 100% dimensional control of pieces in a production line. It is applied best but not exclusively to control small size metal pieces whose tolerances are on the order of a micron and the sizes from a few millimeters to centimeters. The invention also lends itself as well to the measurement of absolute sizes and to the comparison of one size in relation to a reference.

2. Background of the Prior Art

A known optical control method resorts to the appearance of Moiré figures by the superposition of light fringes projected on the object to be measured and fringes of a mask obtained from a reference piece. Another known optical control method is described in patent application No. CH 8715/77. Here the difference in relation to a reference size is obtained by determining the amount of light going through a mask and coming from the object to be measured, the object being illuminated through a grid.

These methods suffer from the drawbacks that they require the projection of fine fringes of very high contrast and the mask must be very exact.

The control is made on a surface element, or even on the entire surface of the object to be measured. For this reason, the signal-to-noise ratio is slight when the error to be detected is small in relation to the surface element scanned. Moiré fringes are generally difficult to interpret quantitatively, and detection of the light that has gone through a mask provides only a "mean" value of the defects present. Further, both methods are sensitive to the surface of the piece to be measured.

SUMMARY OF THE INVENTION

The purpose of this invention is to remedy these drawbacks and to propose an optical control system that performs measurements at selected points on the surface and is compatible with the traditional process of using mechanical feeders. The invention is characterized in that a group of regular fringes in uniform linear translation are projected on an object to be measured; in that the image of the illuminated object is observed by an optical system in a direction different from and not perpendicular to the direction of the projection; in that at least two points in an image plane forming the reflected or diffused light signal of the image of the projected fringes are detected, of which one is the image of a reference point; and in that the phase difference between the signal at the reference image point and the signal at any other measurement image point is determined.

The measurement method according to the invention is only slightly sensitive to the surface state of the object controlled, insofar as the surface defects are small in relation to the pitch of the projected fringes. Measurement of sizes is done only at selected points of the controlled object, which makes it possible to obtain a much more significant signal-to-noise ratio. Other advantages inherent in the sizing process according to the invention relate to the fact that a phase difference measurement is made. Thus, the requirements for precision of a mask and clarity of the projected fringes are not as high, while a great precision in measurement is maintained. Actually, the phase measurements are easily made with a relative error of the order of $10^{-3}$. Other advantages of the system will be set forth during the following description.

BRIEF DESCRIPTION OF THE DRAWINGS

The accompanying figures show by way of example the sizing process according to the invention and the means necessary for using the system, wherein FIG. 1 is a schematic view of a first variant of measurement in accordance with the process; and FIG. 2 shows a second variant of using the process.

DETAILED DESCRIPTION OF THE INVENTION

In FIG. 1, the fringes of light projected on an object are indicated by F. Fringes F have a regular pitch $P_o$ and move linearly at a constant velocity $V_x$. Fringes F are projected on a three-dimensional object 3D characterized by two curves of the system of the Cartesian axes OXYZ. Point B is a point on the surface of object 3D.

An optical system illustrated by a lens L gathers a part of the light rays diffused or reflected by object 3D and forms an image of it on plane M. The image of point B is, therefore, B'. The image of a point $B_o$, selected as a reference point, is $B_o'$. For simplification, it will be assumed that the magnification ratio of the optical system is unitary.

At least two point detectors are placed on plane M, where, as FIG. 1 shows, optical fibers $C_o$ and $C_1$ connect the points on image plane M to phase detectors $D_o$ and $D_1$. A phase detector $\phi$ measures the phase of the signal between point $B_o'$ and another selected point $B'$.

The sizing process of object 3D according to the invention occurs as follows. The phase difference $\Psi_o$ between the signals at points $B_o'$ and $B'$ for a control piece is determined. The phase difference between $B_o'$ and $B'$ is the same $\Psi_o$ for any other piece identical in size with the control piece. However, the system shows another value $\Psi$ for any piece whose elevation along the OZ axis at B in relation to $B_o$ is different than the elevation along the OZ axis at B in relation to $B_o$ for the control piece. The value of the phase difference $\Psi - \Psi_o$ is proportional to the deviation $\Delta Z$ in relation to the control piece.

The operation according to FIG. 1 is the following. Fringes F, parallel to plane OXY, are projected with a pitch $P_o$ in a direction parallel to plane OXZ at an angle $\alpha$ with axis OZ on an object 3D. The tangent to the surface of object 3D along a plane parallel to plane OXZ forms an angle $\delta$ with a line perpendicular to plane OYZ. Thus, the image of fringes F will have a pitch P at image point B', pitch P being given by the formula:

$$P = P_o \frac{\cos \delta}{\cos(\alpha - \delta)} \qquad (1)$$

(with the hypothesis of unit magnification). A variation $\Delta Z$ of the piece at B in relation to the control piece then causes a shift $\Delta X$ of the fringe at M given by:

$$\Delta X = \Delta Z \sin \alpha (P/P_o) \qquad (2)$$

A detector placed at image point B' sees the fringes pass in uniform translation at velocity $V_x$ and provides a signal of the form:

$$S(B') = A(B') \cos\{\omega\tau + (\Psi - \Psi_o)\} \quad (3)$$

where the pulse $\omega = 2\pi V_x/P_o$;
phase difference $(\Psi - \Psi_o) = 2\pi\Delta X/P$; and
$A(B')$ = amplitude of the signal at (B').

The phase difference $\Psi_o$ of the control piece can be selected arbitrarily as value 0 by a simple adjustment of the phase detector $\phi$.

Phase difference $\Psi$ is proportional to the shift $\Delta X$ of the fringes on the image plane, $\Delta X$ being itself proportional to the variation of height $\Delta Z$ of the piece to be measured. Phase difference $\Psi$ is then indeed proportional to deviation $\Delta Z$.

From formula (2) above, it can be seen that the angle of projection $\alpha$ should be other than the value 0 or $\pi$, otherwise $\Delta X$ is always zero. Further, $\alpha$ is preferably not $\pi/2$ because control of plane pieces would be impossible (in relation (1), P is indeterminate for $\alpha = \pi/2$ and $\delta = 0$).

By choosing the reference point $B_o$ on the support of the control piece, the sizing process according to the invention makes it possible to perform absolute measurements. On the other hand, if the reference point $B_o$ is on the piece 3D to be measured, the sizing process makes it possible to detect errors of relative elevation between two points B and $B_o$ of piece 3D.

The optical sizing process, as described in principle so far, is very sensitive to the placement of point detectors $D_o, D_1 \ldots$ placed on image plane M. A very slight shift in a direction perpendicular to the fringes, on the order of 1/100 of the pitch of the fringes, is enough to introduce a measurement error. This severe precision requirement of the detectors is incompatible with an industrial environment. A means for making the process insensitive to a large extent to the positioning precision of the detectors is described below.

A mask is provided merged with the image plane M, the mask itself being the image of the fringes projected on the control piece. The mask can either be drawn or photographed and will exhibit transparent zones alternating with opaque zones, the zones preferably being clearly defined. The detectors, at least as broad as the transparent zones, rather than point detectors, are placed behind the transparent zones and provide an electric signal corresponding to the mean of the light signal on the entire width of the transparent zone. Thus, the detectors can be positioned with a certain tolerance, limited in that the detector gathers the light signal over the entire width of the transparent zone.

Another advantage of the mask is the fact of recording permanently the phase differences $\Psi_o$ of the control piece. This makes it possible to avoid measurement of the reference phase difference $\Psi_o$ from any other point B whose height it is desired to control on mass produced pieces. Positioning of the detectors is thus greatly facilitated.

There are several means for producing fringes passing at a constant velocity $V_x$. A first method consists of causing a grid to pass by any light source. A second consists in obtaining interference fringes from two sources of coherent light. The passing of the fringes can be done by a staggering $\Delta\omega$ of their respective pulses. Various methods are described in the review *Applied Optics,* Volume 2, page 839 (1963); Volume 8, page 538 (1969); Volume 9, page 649 (1970); or in *IEEE Journal of Quantum Electronics,* QE-7, page 450 (1971), for example.

Interference fringes have the advantage of being able to be projected on a much greater field depth than fringes obtained with incoherent light. The optical sizing process according to the invention readily lends itself to industrial automation and makes it possible to control rapidly, without creating a delay in the production line, 100% of the pieces fabricated. The control can be performed on one or more critical points in relation to the reference point. The requirements of precision in lateral positioning of the pieces for control depend on the fineness of the details machined on the piece. It suffices that the detectors always pick up the same surface element of the piece. The precision in depth positioning is not critical for relative measurements.

The optical sizing process according to the invention not only makes it possible to make elevation controls of pieces in a production line but also to establish the profile of any small piece. This case is shown in FIG. 2. The object 3D, whose profile it is desired to determine, is located on and adjacent to a plane reference surface $3D_o$. The two objects are scanned by the same group of parallel fringes. Two detectors in the image plane, parallel to the fringes, follow the scanning of the fringes of the plane surface. The phase difference between the two detectors provides a measurement of the profile of object $3D_o$. Instead of providing two mobile detectors, a succession of stationary detectors can be employed.

The optical sizing process according to the invention is sufficiently precise for industrial application in micromechanics. Actually, the depth resolution is given by: $R_x = \epsilon \cdot P_o / \sin\alpha$.

With a precise phase detector having an accuracy error of $\epsilon = 10^{-3}$, with $P_o - 10$ lines/mm and with illumination at an angle $\alpha$ of 15°, an axial resolution of 0.4 microns is obtained. The lateral resolution, or minimal distance between two measurement points is given by the distance between fringes which is 100 microns in this example.

The optical sizing method according to the invention finds it limit of application in the measurement field depth. The maximum divergence of the phase difference at a point is between $-\pi$ and $+\pi$.

The maximal elevation error or the maximal elevation variation admissible is then $$\Delta Z ma = P_o / \sin\alpha.$$

In the above example, $\Delta Z$ max $\approx 0.39$ mm, which is certainly sufficient for most micromechanical applications. In the application of FIG. 2, the measurement field depth is extended with a greater distance between fringes.

What is claimed is:

1. An optical measuring process for determining the relative size of an object comprising the steps of:
    (a) projecting a group of regular interference fringes in uniform linear translation toward the object to be measured;
    (b) observing by an optical system non-perpendicular to the direction of projection of the fringe an image formed by the fringes projected by the object;
    (c) detecting a light signal of the image at two or more points; and (d) comparing a phase difference between the light signal of the image at two or more reference points to a given phase difference, thereby determining the relative size of the object at two corresponding points along a direction perpendicular to said projected fringes as compared to the given phase difference.

2. The optical measuring process according to claim 1 wherein the light signal of the image of the projected fringes is detected by stationary detectors located on the image plane.

3. The optical measuring process according to claim 1 wherein the step of projecting includes moving the group of regular interference fringes across the object to be measured; the step of detecting includes detecting a light signal of the image at substantially all points; and the step of comparing includes comparing a phase between the light signal of the image at all points to a given phase, thereby determining the relative shape of the object as compared to the given phase.

4. The optical measuring process according to claims 2 or 3 wherein the light signal of the image of the projected fringes of the image plane is detected through optical fibers.

5. The optical measuring process according to claims 1 or 2 wherein the step of detecting is performed by detectors placed behind transparent zones of a mask merged with the image plane, the mask being the image of the fringes projected on a reference object, and wherein the detectors provide an electrical signal corresponding to the mean of the light signal over the entire width of the transparent zone.

6. A system for determining the relative size of an object comprising:
 (a) means for projecting a group of regular interference fringes in uniform linear translation toward the object to be measured;
 (b) an optical system which projects the image formed by the fringes projected by the object on an image plane;
 (c) at least two light signal detectors for detecting the projected light fringes located on the image plane; and
 (d) a phase detector means which measures the phase difference between the light signal detectors.

7. The system of claim 6 further including a mask merged with the image plane, said mask being the image of the fringes projected on a reference object.

8. The system of claim 6 wherein the means for projecting regular fringes is comprised of a light source in front of which is a grid passing at a constant velocity.

9. The system of claim 6 wherein the means for projecting regular fringes is comprised of a superposition of two coherent light beams.

10. An optical measuring process for determining the absolute size of an object as compared to a reference object comprising the steps of:
 (a) projecting a group of regular interference fringes in uniform linear translation toward the reference object;
 (b) observing by an optical system non-perpendicular to the direction of projection of the fringes an image formed by the fringes projected by the reference object;
 (c) detecting a light signal of the image at a point;
 (d) projecting the group of regular interference fringes in uniform linear translation toward the object to be measured;
 (e) observing by the optical system an image formed by the fringes projected by the object to be measured;
 (f) detecting a light signal of the image at a point; and
 (g) comparing a phase of the light signal of the image of the reference object at the point to the phase of the light signal of the image of the object to be measured at the point, thereby determining the absolute difference in size at the point of the object to be measured as compared to the point of the reference object.

11. The optical measuring process of claim 10 wherein the image formed by the fringes projected by the object to be measured and the reference object are in the form of reflected light.

12. The optical measuring process according to claims 10 or 11 wherein the image formed by the fringes projected by the object to be measured and the reference object are in the form of diffused light.

* * * * *